US006798571B2

(12) United States Patent
Wetzel et al.

(10) Patent No.: US 6,798,571 B2
(45) Date of Patent: Sep. 28, 2004

(54) SYSTEM FOR MICROSCOPIC DIGITAL MONTAGE IMAGING USING A PULSE LIGHT ILLUMINATION SYSTEM

(75) Inventors: Arthur W. Wetzel, Murrysville, PA (US); John R. Gilbertson, II, Pittsburgh, PA (US); Jeffrey A. Beckstead, Valencia, PA (US); Patricia A. Feineigle, Pittsburgh, PA (US); Christopher R. Hauser, Pittsburgh, PA (US); Frank A. Palmieri, Jr., Gibsonia, PA (US)

(73) Assignee: InterScope Technologies, Inc., Wexford, PA (US)

( * ) Notice: Subject to any disclaimer, the term of this patent is extended or adjusted under 35 U.S.C. 154(b) by 278 days.

(21) Appl. No.: 09/757,703

(22) Filed: Jan. 11, 2001

(65) Prior Publication Data

US 2002/0089740 A1 Jul. 11, 2002

(51) Int. Cl.$^7$ .......................... G02B 21/00; G02B 21/36
(52) U.S. Cl. ................... 359/385; 359/368; 359/363
(58) Field of Search .................. 359/368–390; 382/128–133

(56) References Cited

U.S. PATENT DOCUMENTS

| 3,999,047 | A | 12/1976 | Green | 235/151.3 |
| 4,136,950 | A | 1/1979 | Labrum et al. | 356/28 |
| 4,150,360 | A | 4/1979 | Kopp et al. | 340/146.3 |
| 4,199,748 | A | 4/1980 | Bacus | 340/146.3 |
| 4,213,036 | A | 7/1980 | Kopp et al. | 235/92 |

(List continued on next page.)

FOREIGN PATENT DOCUMENTS

| DE | 3922358 A1 | 1/1991 |
| EP | 0 557 558 A1 | 9/1993 |
| GB | 1 404 628 | 9/1975 |
| WO | WO 97/04347 | 2/1997 |

OTHER PUBLICATIONS

"An Efficient Method for Automated Segmentation of Histochemically Stained Slides", Gaddipati et al., IEEE–EMBC and CMBEC (1995), pp 497–498.

"Automatic Threshold Selection Using Histogram Quantization", Wang et al., Journal of BioMedical Optics, vol. 2, No. 2 (Apr. 1997), pp 211–217.

"FSED–Feature Selective Edge Detection", Borga et al. (2000), pp 1–4.

Illumea Product Group Internet Page.

"Biomarkers of Premalignant Breast Disease and Their Use as Surrogate Endpoints in Clinical Trials of Chemopreventive Agents", Boone et al., The Breast Journal, vol. 1, No. 4 (1995), pp 226–239.

"Development of Breast Cancer Chemopreventive Drugs", Kelloff et al., Journal of Cellular Biochemistry, 17G:2–13 (1993), pp 1–13.

(List continued on next page.)

Primary Examiner—Thong Nguyen
(74) Attorney, Agent, or Firm—Richard W. James; Arlene P. Neal

(57) ABSTRACT

An illumination system for microscopic digital montage imaging based on a pulsed light illumination source triggered by the position of a specimen with respect to the optical axis of the microscope. The strobe illumination is used to facilitate high-speed tiled (montage) image capture of otherwise static specimens with higher throughput and significantly reduced mechanical precision requirements and cost. The invention allows for perfectly aligned montage tiles at high throughputs using standard microscope optics, having camera frame rate be the limiting factor in microscopic tiled image capture.

32 Claims, 2 Drawing Sheets

U.S. PATENT DOCUMENTS

| | | | |
|---|---|---|---|
| 4,523,278 A | 6/1985 | Reinhardt et al. | 364/413 |
| 4,668,983 A * | 5/1987 | Werson | 358/106 |
| 4,742,558 A | 5/1988 | Ishibashi et al. | 382/56 |
| 4,779,151 A | 10/1988 | Lind et al. | 360/92 |
| 4,965,725 A | 10/1990 | Rutenberg | 364/413.1 |
| 5,068,906 A | 11/1991 | Kosaka | 382/48 |
| 5,072,382 A | 12/1991 | Kamentsky | 364/413.08 |
| 5,073,857 A | 12/1991 | Peters et al. | 364/413.1 |
| 5,099,521 A | 3/1992 | Kosaka | 382/6 |
| 5,107,422 A | 4/1992 | Kamentsky et al. | 364/413.08 |
| 5,123,056 A | 6/1992 | Wilson | 382/6 |
| 5,143,193 A | 9/1992 | Geraci | 194/212 |
| 5,149,972 A | 9/1992 | Fay et al. | 250/461.1 |
| 5,163,095 A | 11/1992 | Kosaka | 382/6 |
| 5,216,500 A | 6/1993 | Krummey et al. | 358/93 |
| 5,216,596 A | 6/1993 | Weinstein | 364/413.02 |
| 5,218,645 A | 6/1993 | Bacus | 382/6 |
| 5,252,487 A | 10/1993 | Bacus et al. | 436/63 |
| 5,257,182 A | 10/1993 | Luck et al. | 364/413.1 |
| 5,260,871 A | 11/1993 | Goldberg | 364/413.02 |
| 5,268,966 A | 12/1993 | Kasdan | 382/6 |
| 5,287,272 A | 2/1994 | Rutenberg et al. | 364/413.01 |
| 5,297,034 A | 3/1994 | Weinstein | 364/413.02 |
| 5,313,532 A | 5/1994 | Harvey et al. | 382/15 |
| 5,333,207 A | 7/1994 | Rutenberg | 382/6 |
| 5,363,258 A | 11/1994 | Coles et al. | 360/92 |
| 5,428,690 A | 6/1995 | Bacus et al. | 382/128 |
| 5,471,561 A | 11/1995 | Cowgill et al. | 395/82 |
| 5,473,706 A | 12/1995 | Bacus et al. | 382/133 |
| 5,499,097 A | 3/1996 | Ortyn et al. | 356/372 |
| 5,505,946 A | 4/1996 | Kennedy et al. | 424/195.1 |
| 5,544,650 A | 8/1996 | Boon et al. | 128/632 |
| 5,544,996 A | 8/1996 | Castaldi et al. | 414/280 |
| 5,625,765 A | 4/1997 | Ellenby et al. | 395/135 |
| 5,636,425 A | 6/1997 | Best | 29/407.04 |
| 5,671,288 A * | 9/1997 | Wilhelm et al. | 382/128 |
| 5,680,694 A | 10/1997 | Best | 29/701 |
| 5,687,251 A | 11/1997 | Erler et al. | 382/133 |
| 5,700,125 A | 12/1997 | Falace et al. | 414/276 |
| 5,768,125 A | 6/1998 | Zinger et al. | 364/167.01 |
| 5,784,162 A | 7/1998 | Cabib et al. | 356/346 |
| 5,796,861 A | 8/1998 | Vogt et al. | 382/128 |
| 5,835,620 A | 11/1998 | Kaplan et al. | 382/133 |
| 5,838,837 A | 11/1998 | Hirosawa et al. | 382/284 |
| 5,848,177 A | 12/1998 | Bauer et al. | 382/128 |
| 5,912,699 A | 6/1999 | Hayenga et al. | 348/132 |
| 5,933,519 A | 8/1999 | Lee et al. | 382/133 |
| 6,031,930 A | 2/2000 | Bacus et al. | 382/133 |
| 6,040,139 A * | 3/2000 | Bova | 435/6 |
| 6,081,612 A | 6/2000 | Gutkowicz-Krusin et al. | 382/128 |
| 6,101,265 A | 8/2000 | Bacus et al. | 382/133 |
| 6,316,782 B1 * | 11/2001 | Akselrod et al. | 250/582 |

OTHER PUBLICATIONS

"Development of Surrogate Endpoint Biomarkers for Clinical Trials of Cancer Chemopreventive Agents: Relationships to Fundamental Properties of Preinvasive (Intraepithelial) Neoplasia", Boone et al., Journal of Cellular Biochemistry, Supplement 19:10–22 (1994), pp 1–22.

"Markovian Analysis of Cervical Cell Images", Norman J. Pressman, The Journal of Histochemistry and Cytochemistry, vol. 24., No. 1, pp. 138–144 (1976).

"Quantiation of Preinvasive Neoplastic Progression in Animal Models of Chemical Carcinogenesis", Bacus et al., Journal of Cellular Biochemistry Supplements 28/29:21–38 (1997).

"Analytical and Quantitative Cycology and Hiscology", Chromatin Texture Measurement by Markovian Analysis, Dawson et al.

"The Image Processing Handbook", John C. Russ—2nd ed., pp 495–498.

"Segmentation of Mammograms Using Multiple Linked Self-Organizing Neural Networks", Dance et al., Med. Phys. 22(2) (Feb. 1995), pp 145–152.

"Hough Spectrum and Geometric Texture Feature Analysis", Zhang et al., 1994 IEEE, pp 583–585.

"Cervical Cell Recognition and Morphometric Grading by Image Analysis", James W. Bacus, Journal of Cellular Biochemistry, Supplement 23:33–42 (1995), pp 33–42.

"Detection and Characterization of Microcalcifications in Mammographic Images", Pereira et al., 1996 IEEE, pp 1369–1372.

\* cited by examiner

SYSTEM FOR MICROSCOPIC DIGITAL MONTAGE IMAGING USING A PULSE LIGHT ILLUMINATION SYSTEM

FIELD OF THE INVENTION

The present invention relates to microscopic digital imaging of complete tissue sections for medical and research use. In particular it describes a method for high throughput montage imaging of microscope slides using a standard microscope, digital video cameras, and a unique pulsed light illumination system.

BACKGROUND OF THE INVENTION

Laboratories in many biomedical specialties, such as anatomic pathology, hematology, and microbiology, examine tissue under a microscope for the presence and the nature of disease. In recent years, these laboratories have shown a growing interest in microscopic digital imaging as an adjunct to direct visual examination. Digital imaging has a number of advantages including the ability to document disease, share findings, collaborate (as in telemedicine), and analyze morphologic findings by computer. Though numerous studies have shown that digital image quality is acceptable for most clinical and research use, some aspects of microscopic digital imaging are limited in application.

Perhaps the most important limitation to microscopic digital imaging is a "sub-sampling" problem encountered in all single frame images. The sub-sampling problem has two components: a field of view problem and a resolution-based problem. The field of view problem occurs when an investigator looking at a single frame cannot determine what lies outside the view of an image on a slide. The resolution-based problem occurs when the investigator looking at an image is limited to the resolution of the image. The investigator cannot "zoom in" for a closer examination or "zoom out" for a bird's eye view. Significantly, the field of view and resolution-based problems are inversely related. Thus, as one increases magnification to improve resolution, one decreases the field of view. For example, as a general rule, increasing magnification by a factor of two decreases the field of view by a factor of four.

To get around the limitations of single frame imaging, developers have looked at two general options. The first option takes the general form of "dynamic-robotic" imaging, in which a video camera on the microscope transmits close to real time images to the investigator looking at a monitor, while the investigator operates the microscope by remote control. Though such systems have been used successfully for telepathology, they do not lend themselves to documentation, collaboration, or computer based analysis.

The second option being investigated to overcome the limitations inherent in single frame imaging is a montage (or "virtual slide") approach. In this method, a robotic microscope systematically scans the entire slide, taking an image at every field. The individual images are then "knitted" together in a software application to form a very large data set with very appealing properties. The robotic microscope can span the entire slide area at a resolution limited only by the power of the optical system and camera. Software exists to display this data set at any resolution on a computer screen, allowing the user to zoom in, zoom out, and pan around the data set as if using a physical microscope. The data set can be stored for documentation, shared over the Internet, or analyzed by computer programs.

The "virtual slide" option has some limitations, however. One of the limitations is file size. For an average tissue section, the data generated at 0.33 um/pixel can be between two and five gigabytes uncompressed. In an extreme case, the data generated from one slide can be up to thirty-six gigabytes.

A much more difficult limitation with the prior systems is an image capture time problem. Given an optical primary magnification of twenty and a two-third inch CCD, the system field of view is approximately (8.8 mm×6.6 mm)/20=0.44×0.33 mm. A standard tissue section of approximately 2.25 square centimeters, therefore, requires approximately fifteen hundred fields to cover the tissue alone.

Field rate in montage systems is limited by three factors—camera frame rate, image processing speed, and the rate of slide motion between fields. Given today's technology, the rate of slide motion is a significant limiting factor largely because the existing imaging systems require the slide to come to a stop at the center of each field to capture a blur free image of the field.

For example, traditional bright field microscopic illumination systems were designed to support direct visual examination of specimen on the field and therefore depend on a continuous light source for illumination. Continuous light however, is a significant limitation for digital imaging in that the slide must be stationary with respect to the camera during CCD integration. Slide motion during integration results in a blurred image. Traditional montage systems, therefore, have had to move the slide (and stage) from field to field in a precise "move, stop, take image and move again" pattern. This pattern requires precise, expensive mechanics, and its speed is inherently limited by the inertia of the stage.

Thus, a system is needed to address the image capture time limitation. The system must also enable efficient and high quality imaging of a microscope slide via a high-resolution slide scanning process.

SUMMARY OF THE INVENTION

The present invention relates to a method and illumination system for imaging a specimen on a slide. The system includes a motorized stage, a pulse light illumination system, and a stage position detector. The motorized stage moves the slide while an image of the slide is captured. The pulsed light illumination system optically stops motion on the motorized stage while allowing continuous physical movement of the motorized stage and thus the slide. The stage position detector is associated with the motorized stage and the stage position detector controls firing of the pulsed light illumination system at predetermined positions of the motorized stage.

It is therefore an object of the invention to provide a microscopic imaging system for whole slide montage in which standard microscope optics, off the shelf cameras, a simple motorized stage, and pulse light illumination system can be used to produce perfectly aligned image tiles, and acquire these images at a speed limited by the camera frame rate.

The present invention uses a strobe light triggered by a direct Ronchi ruler or other stage-positioning device, to produce precisely aligned image tiles that can be made into a montage image of tissue sections on a microscope slide. Significantly, due to the short light pulse emitted by a strobe, clear images can be obtained without stopping the microscope stage. This significantly increases the image throughput while decreasing the expense and precision required in the stage mechanics.

In the preferred embodiment, a strobe arc is placed at the position of the lamp bulb in a standard microscope system.

The camera shutter is opened and the strobe is fired, in response to the position of the stage as reported by a direct position sensor. If stray light is minimized, the camera exposure can be much longer than the strobe flash, allowing low cost cameras to be utilized.

It is another object of the invention to significantly increase the image throughput of a tiling image system by allowing, through the use of the strobe light, continuous motion of the slide under the microscope. The inventive system thus eliminates the need to stop the microscope stage to capture an image.

It is another object of the invention to reduce the demands of camera, stage, and strobe synchronization by controlling the firing of the strobe light based on direct stage position feedback, thereby, substantially reducing the mechanical specifications on the stage and camera components.

Additional features and advantages of the invention will be set forth in the description that follows, and in part will be apparent from the description, or may be learned by practice of the invention. The objectives and advantages of the invention to be realized and attained by the microscopic image capture system will be pointed out in the written description and claims hereof as well as the appended drawings.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention.

DESCRIPTION OF THE PREFERRED EMBODIMENTS

Reference will now be made in detail to the preferred embodiments of the present invention, examples of which are illustrated in the accompanying drawings. The following paragraphs describe the functionality of the inventive system and method for high throughput montage imaging of microscope slides using a standard microscope, camera, and a pulsed light illumination system.

Figure 1:
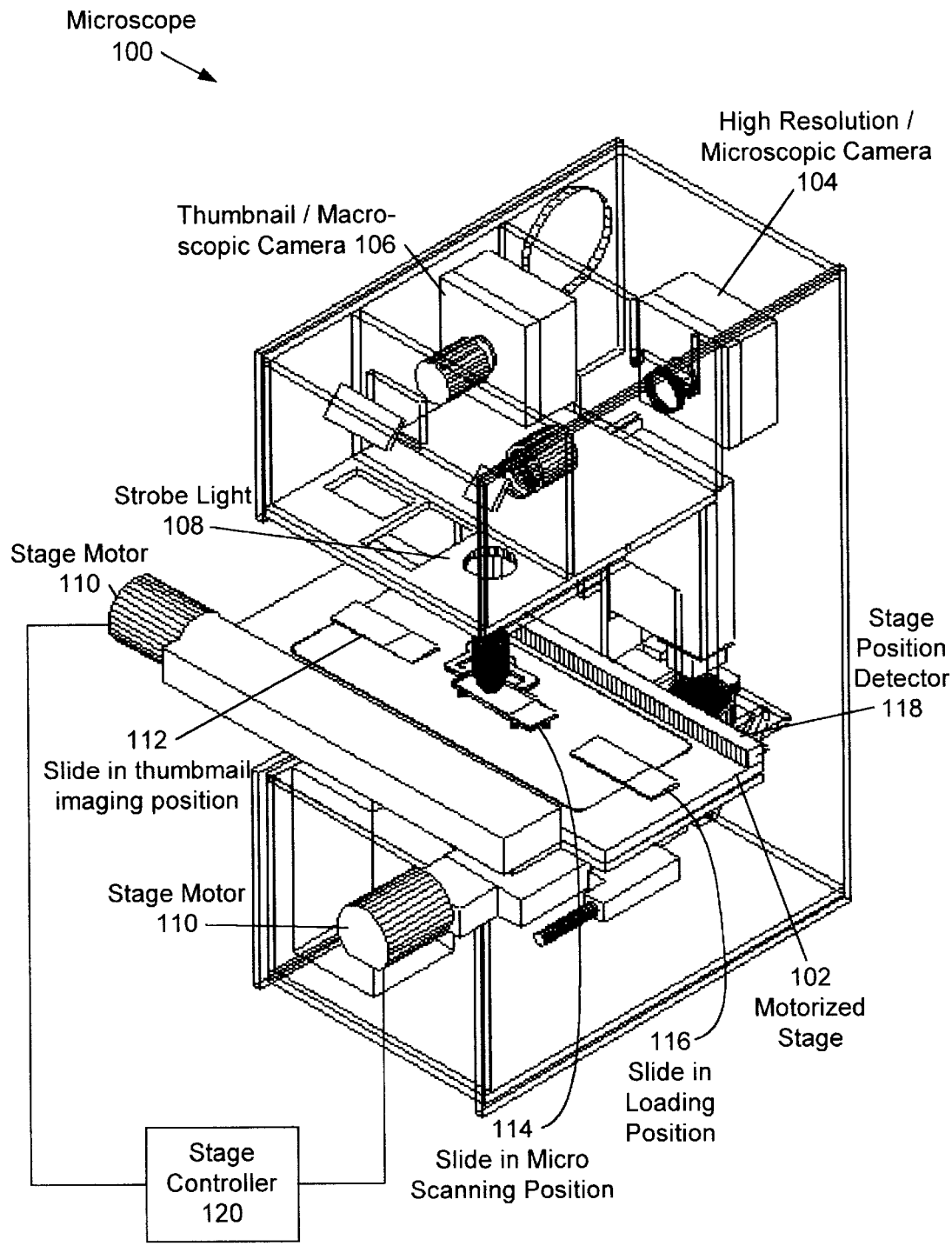
FIG. 1 illustrates a view of the system in a preferred embodiment.

FIG. 1 illustrates a microscope 100 that may be a bright field microscope in an embodiment of the invention. The microscope 100 includes a microscopic camera 104 that may be utilized to capture a high-resolution image of an object and a macroscopic camera 106 that may be utilized to capture a thumbnail image of an object, That embodiment also includes a motorized stage 102 and two stage motors 110 for moving the motorized stage 102 along X and Y-axes. Moreover, that embodiment includes a strobe light 108. A slide is also shown in a loading position 116 a micro scanning position 114 and a thumbnail imaging position 112. In this embodiment, a slide to be imaged is placed in the micro scanning position 114 in a slide holder on a motorized stage 102 and is scanned under microscope optics of the microscopic camera 104 To facilitate rapid imaging of the slide and to avoid the stop image reposition delays associated with traditional imaging systems a high-speed strobe light 108 is used to optically stop the motion of the stage 102, and the slide specimen situated on the stage 102, while allowing continuous stage motion. It should be apparent to one skilled in the art, that any pulsed light illumination system may be used in place of the high-speed strobe light 108.

To eliminate overlap or missed tissue between microscope images, precise alignment of the stage 102 and the camera 104, along with accurate stage positioning, and camera 104 and strobe 108 synchronization, are required. To reduce camera 104 specifications, a direct stage position sensor 118 is used to control the firing of strobe 108, and thus the microscopic camera 104 exposure. In that fashion, the microscopic camera 104 can be operated with a long exposure window in comparison to a very short strobe flash, allowing lower cost components, specifically the stage 102 and the camera 104, to be utilized In the invention, a computer program controls the operation of the stage 102, the camera 104 and the strobe 108 illumination. The actual slide scanning can be automated to image entire slides, image only a portion of the slide or use a user-interface to allow the user to select the regions to be imaged. Once a region has been selected for imaging, the program then controls the operation by communicating with a stage controller 120, the stage position sensor 118, the microscopic camera 104 and strobe firing circuitry for the strobe 108. Preferably, tiling is performed by moving stepwise along the short axis and with continuous motion along the long axis. In other words, tiling is done one row at a time. For that reason, stage position is monitored and controlled differently along each stage axis. Along the short axis of the slide, the stage position is monitored and controlled, by the program, directly through the stage controller 120. Along the long axis however, the stage position is monitored by a direct stage position sensor 118, which can be separate or part of the overall stage control circuitry.

In a preferred embodiment, a Ronchi ruler attached to the stage 102 is used for the stage position sensor 118, as illustrated in FIG. 1. It should be obvious to those skilled in the art that any position sensor may be used in the invention. This sensor can be external to the stage controller 120 or the positional information can be acquired directly from the stage controller 120 with or without feedback.

For reference, a Ronchi ruler is a pattern of alternating light and dark bands, equally spaced along a substrate, typically either glass or plastic. A position sensor 118 based on the Ronchi ruler utilizes a light sensor that is mechanically isolated from the ruler. As the ruler passes under the light sensor, a series of electronic pulses is generated corresponding to the alternating light and dark bands of the ruler. Those pulses can be used to monitor the position and direction of the stage 102.

Based on the magnification of the optics and the microscopic camera 104 utilized, the strobe 108 is fired whenever the position sensor 118 determines the stage 102 has moved into the neighboring field of view of the microscopic camera 104. The system continues to capture image tiles with precise alignment, until the row is finished or the controlling program tells the system to stop. At the end of the capture process, the slide is removed and another slide can be inserted. With current technology, the rate-limiting step for image capture is the data transfer period in the microscopic camera 104.

Figure 2:
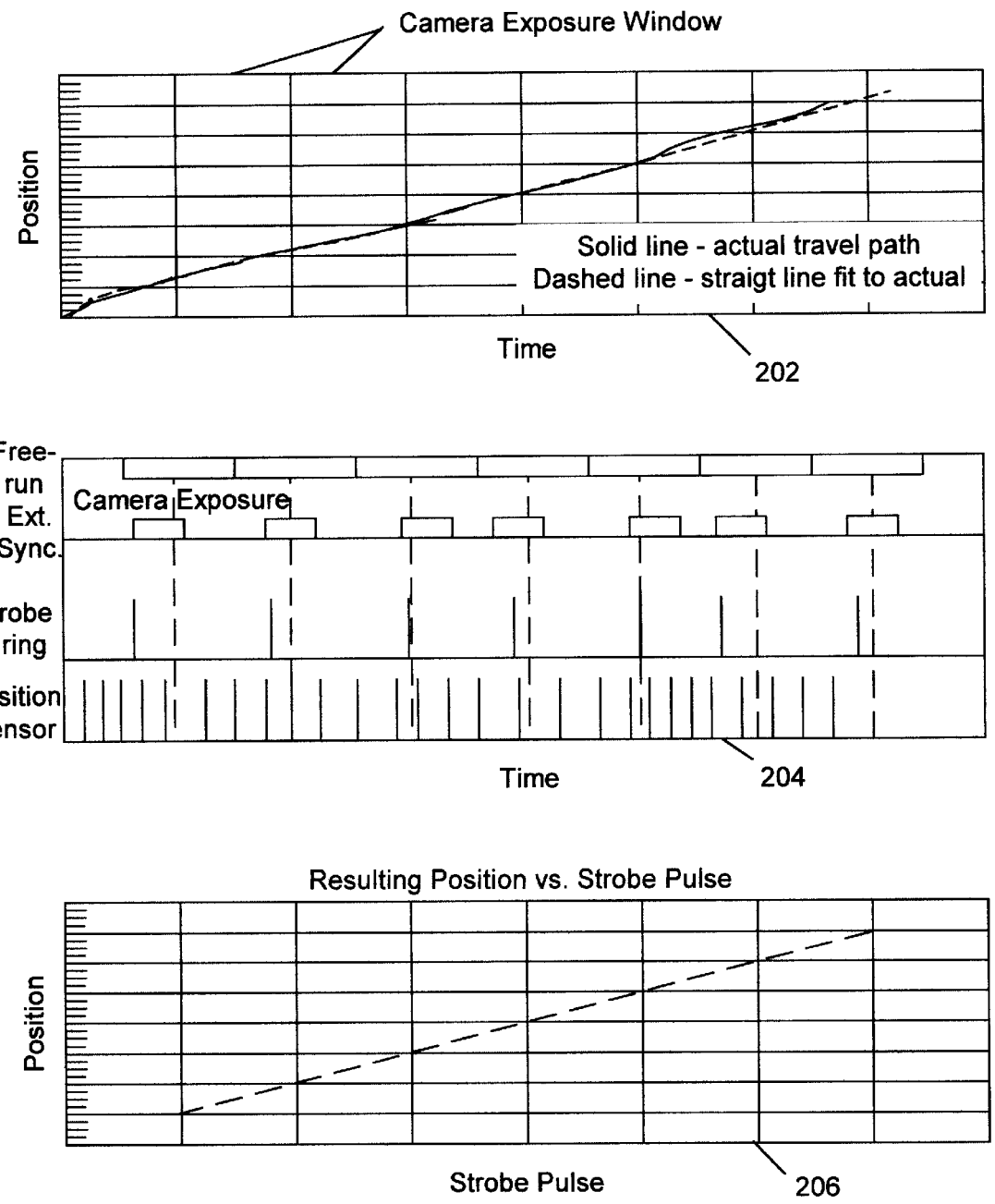
FIG. 2 illustrates timing diagramming for a camera, stage and strobe of the present invention.

FIG. 2 illustrates the signals of the camera 104 the stage 102, the stage position detector 118, and the strobe 108. Note that in FIG. 2, the signals from the stage position detector 118 represent motion of the stage 102, so their timing will vary depending on the speed of the stage movement. Because the system is triggered by the location of the stage 102 as reported by the stage position sensor 118, the absolute speed of the stage movement is not relevant, allowing for the use of low cost stages.

The system can be run in one of two modes, depending on how the microscopic camera 104 is controlled. In a preferred embodiment, the stage 102 location, as sensed by the position sensor 118, fires both the camera 104 and the strobe 108. In an alternate embodiment, the microscopic camera 104 is free running and only the strobe 108 is fired by stage 102 position. The alternative embodiment does not depend on uniform motion of the stage 102 over the area imaged, because the strobe pulse is much shorter than the integration time of the camera 104. As long as the correct stage position is reached anytime within the integration time of the camera 104, an excellent, well aligned image results.

At 202 of FIG. 2, actual position of the motorized stage 102 is plotted versus time during capture of an image. That plot of the actual position of the motorized stage 102 is compared to a plot of steady movement to show that actual stage motion is not steady. As shown in 206, firing strobe 108 based on direct position information differs from the more traditional application of strobe photography, shown in 204, where the strobe 108 and the camera 104 are synchronized in time and positional information of the objects can be inferred from the relative position within the image. When operated in the mode where the position feedback controls both the camera 104 and the strobe 108, and the camera 104 is not free running, each camera frame corresponds to an equally spaced positional change, independent of the stage velocity (speed and time variations in the speed). In the case that the camera 104 is free running, the stage speed has to be matched to the camera frame rate only to the accuracy such that the strobe pulse does not fall outside the exposed window. The relative time within the exposure window is irrelevant.

As is obvious to one skilled in the art, while the present invention describes a microscopic optical arrangement, the invention can also be applied to other optical imaging, inspection and illumination systems that are used for building up an image by matching stage speed with camera speed.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed:

1. An illumination system for imaging a specimen, the system comprising:
   a motorized stage, in an optical system, for moving the specimen while image tiles of the specimen are captured;
   a pulsed light illumination system directed toward the motorized stage in the optical system, wherein the pulsed light illumination system optically stops motion on the motorized stage while allowing continuous physical movement of the motorized stage and thus the specimen,
   a stage position detector, associated with the motorized stage, wherein the stage position detector controls firing of the pulsed light illumination system at predetermined positions of the motorized stage; and
   a microscopic camera directed toward the motorized stage to capture an image tile when the pulsed light illumination system illuminates and when the motorized stage is positioned at a next tile location, thereby aligning image tiles by eliminating overlapping of image tiles and eliminating gaps between image tiles.

2. The system of claim 1, wherein the optical system is a bright field microscope.

3. The system of claim 1, wherein the pulsed light illumination system is a standard strobe light.

4. The system of claim 3, wherein as a stage location is determined by the stage position detector, the stage location executes the strobe.

5. The system of claim 4, wherein the system does not depend on uniform motion of the motorized stage over an imaged area to execute the strobe.

6. The system of claim 4, wherein the camera is free running and the motorized stage speed is matched to a frame rate of the camera to an extent that prevents execution of the pulsed light illumination system from falling outside of an exposure window.

7. The system of claim 1, wherein the pulsed light illumination system is any pulsed light source.

8. The system of claim 1, wherein a control program controls operations of the motorized stage, the camera, and the pulsed light illumination system, thereby automating a slide scanning process by enabling imaging an entire slide, imaging of only a portion of the slide or using a user-interface to allow a user to select regions of the slide to be imaged.

9. The system of claim 8, wherein tiling of the slide is performed by moving stepwise along a short axis and with continuous motion along a long axis, wherein the stage position is monitored and controlled differently along each axis.

10. The system of claim 9, wherein along a short axis of the slide, the stage position is monitored and controlled, by the control program, directly through a stage controller and along the long axis the stage position is monitored by the stage position detector.

11. The system of claim 1, wherein the stage position detector is a Ronchi ruler that is attached to the motorized stage.

12. The system of claim 11, wherein the Ronchi ruler is a pattern of alternating light and dark bands that are equally spaced along a substrate.

13. The system of claim 11, wherein the stage position detector utilizes a light sensor that is mechanically isolated from the Ronchi ruler, whereby as the ruler passes under the sensor a series of electronic pulses is generated.

14. The system of claim 13, wherein the series of electronic pulses correspond to alternating light and dark bands of the Ronchi ruler.

15. The system of claim 14, wherein the series of electronic pulses is used to monitor the position and direction of the motorized stage.

16. The system of claim 1, wherein the pulsed illumination system is fired whenever the stage position detector determines that the motorized stage has moved into a neighboring filed of view of the camera.

17. The system of claim 1, wherein the system captures image tiles with precise alignment until a row is captured, controlling program instructs the system to whereby a rate-limiting step for image capture is a data transfer period in the camera.

18. The system of claim 1, wherein the system captures image tiles with precise alignment until a controlling program instructs the system to stop, whereby a rate-limiting step for image capture is a data transfer period in the camera.

19. The system of claim 1, wherein signals from the stage position detector represent motions of the motorized stage, whereby timing of the signals vary depending on speeds of the motorized stage.

20. The system of claim 19, wherein an absolute speed of the motorized stage is not relevant.

21. The system of claim 1, wherein a stage position as determined by the stage position detector executes the camera and the pulsed light illumination system.

22. The system of claim 21, wherein the camera is not free running and each camera frame corresponds to an equally spaced positional change that is independent of a stage velocity.

23. A method for imaging specimen, the method comprising the steps of:

placing the specimen to be imaged in a holder on a motorized stage;

controlling a tiling process by moving the motorized stage;

capturing image tiles with precise alignment by executing a strobe illumination system whenever a stage position sensor determines that the motorized stage has moved to a neighboring field of view of a camera;

scanning each row; and removing the specimen and inserting another specimen to be imaged.

24. The system of claim 23, wherein the step of controlling comprises the step of attaching a Ronchi ruler to the motorized stage.

25. The method of claim 24, wherein the step of controlling further comprises the step of utilizing a light sensor that is mechanically isolated from the Ronchi ruler, whereby as the Ronchi ruler passes under the light sensor a series of electronic pulses that correspond to alternating light and dark bands of the Ronchi ruler is generated.

26. The method of claim 23, wherein the step of capturing further comprises the step of capturing images of tiles with precise alignment until a row is finished.

27. The method of claim 23, wherein the step of capturing further comprises the step of capturing images of tiles with precise alignment until a controlling program tells the strobe illumination system to stop.

28. The method of claim 23, wherein the step of controlling comprises the step of attaching a non-Ronchi ruler position system to the motorized stage, wherein the position system uses only position information from a stage controller without an external feedback sensor.

29. The method of claim 23, wherein the step of controlling further comprises the step of using a control program to control operations of the motorized stage, the camera, and the strobe illumination system.

30. The method of claim 23, wherein the step of controlling further comprises the step of moving stepwise along a short axis and with continuous motion along a long axis, wherein stage position is monitored and controlled differently along each axis.

31. The method of claim 30, further comprising the steps of monitoring and controlling a stage position, by a control program, directly through a stage controller and monitoring the stage position by a stage position detector along the short axis.

32. An illumination system for imaging a specimen, the system comprising:

a motorized stage in an optical system for moving the specimen while an image of the specimen is captured;

a pulsed light illumination system directed toward the motorized stage in the optical system, wherein the pulsed light illumination system optically stops motion on the motorized stage while allowing continuous physical movement of the motorized stage; and a microscopic camera, directed toward the motorized stage to capture an image tile when the pulsed light illumination system illuminates and when the motorized stage is positioned at a next tile location as determined by using positional information that is calculated from a stage controller, thereby aligning image tiles by eliminating overlapping of image tiles and eliminating gaps between image tiles.

* * * * *